C. L. BYRON.
VEHICLE.
APPLICATION FILED MAR. 26, 1915.
1,230,110.
Patented June 19, 1917.
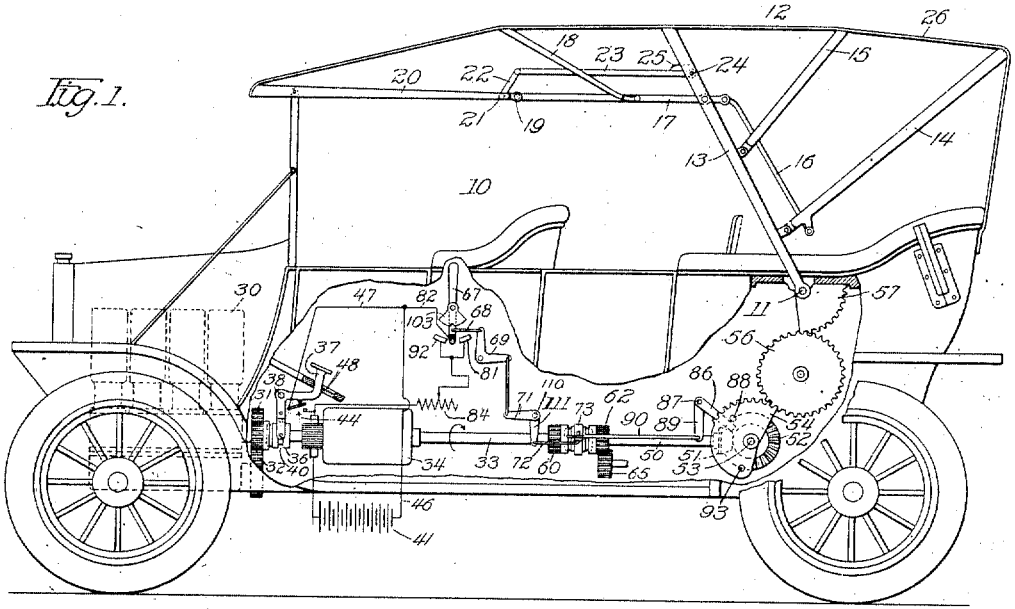
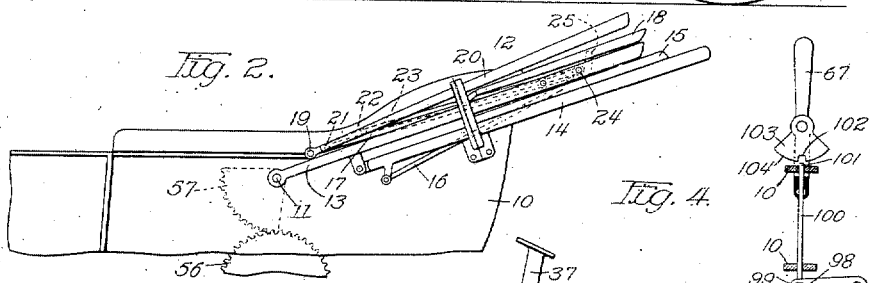
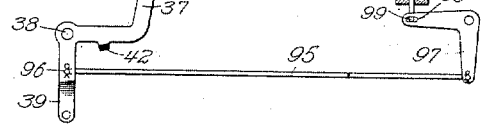
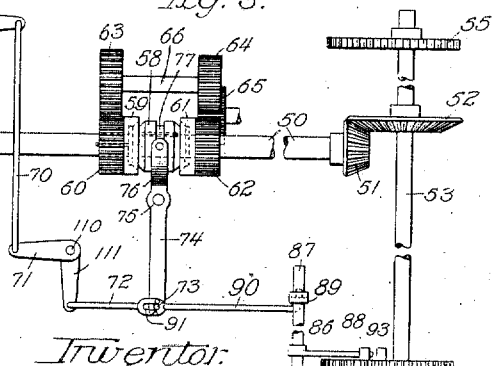
Inventor:
Chas. L. Byron.

UNITED STATES PATENT OFFICE.

CHARLES L. BYRON, OF WINNETKA, ILLINOIS.

VEHICLE.

1,230,110.  Specification of Letters Patent.  Patented June 19, 1917.

Application filed March 26, 1915. Serial No. 17,112.

*To all whom it may concern:*

Be it known that I, CHARLES L. BYRON, a citizen of the United States, residing at Winnetka, in the county of Cook and State of Illinois, have invented certain new and useful Improvements in Vehicles, of which the following is a full, clear, and exact specification.

This invention relates to vehicles, such for example as auto vehicles, and more particularly to automatically actuated tops or weather protective parts thereof and to means for controlling the actuation of said tops or weather protective parts.

One of the objects of this invention is to render it possible to automatically actuate a vehicle top or weather protective part to raise and lower and especially to completely raise and lower the same in an efficient manner.

Another object is to prevent further raising actuating movement to be transmitted to the vehicle top or weather protective part after it is completely raised or further lowering movement after it is completely lowered.

Another object is to make the mechanism fool proof.

These and other objects are accomplished by providing a vehicle top or weather protective part having coöperating elements by means of which the top inherently is capable of spreading out when raised and collapsing when lowered, means for automatically raising and lowering said top, means for disconnecting said top from its actuating source when it is raised and lowered, and safety interlock means between different control members.

The invention is illustrated on the accompanying sheet of drawings in which Figure 1. is a side elevation of a vehicle, parts being broken away and some parts shown diagrammatically, embodying my invention;

Fig. 2 is a fragmentary side elevation of a vehicle showing the top down;

Fig. 3 is a diagrammatic view of operative parts, embodying my invention, it being noted that all parts except the control members are shown in plan for the sake of clearness; and Fig. 4 is a detail of a safety interlock between the top control member and the engine control member.

The various novel features of my invention will be apparent from the following description and drawings, and will be particularly pointed out in the appended claims.

This invention is shown in connection with an automobile 10 having suitably supported studs 11 at the rear portion of the sides on which is pivotally mounted a vehicle top or weather-protective part 12. This top is capable inherently of spreading into a full open position when raised and to collapse completely when lowered. It is essential that this be the case to completely raise and lower the top automatically in the most efficient and satisfactory manner.

The vehicle top 12 includes a main bow 13 pivoted on the studs 11 on both sides of the vehicle. Pivotally secured to this main bow are other supporting bows 14 and 15 to the former of which is pivotally secured on each side a link 16 to one end of which link is pivoted a lever member 17. The lever member on each side is pivoted to the main bow 13, and to each of the lever members is pivoted another bow 18. To the front ends of each of the lever members 17 is pivoted at 19 a front bow 20. Pivoted to the front bow 20 at 21 on one side of connection 19 between lever member 17 and front bow 20 is a link 22 to which is pivotally connected on each side of the top a rod 23, each of which is pivotally connected at 24 to the main bow 13. Secured to the main bow 13 on each side above connection 24 is a stop member 25 which limits the upward movement of rods 23. Fastened to the bows in any suitable manner is a suitable covering 26.

As shown in Fig. 1 the top is raised and the bows, links, rods and levers are arranged accordingly. In this position the lever member 17 and front bow are in the same horizontal plane, the pivotal connection or joint 19 being raised or straightened by a relative separating movement between bows 13 and 14, the movement to the joint being transmitted through links 16. At the same time the front bow is forced into and held in its horizontal position by coöperating action between links 22, rods 23 and stop members 25. It is apparent that with this arrangement the front of the top is completely extended and opened when the main bow 13 is raised to its normal raised position. The action between the various parts to completely extend or raise the top is inherent. In lowering the top, when the main bow 13 is actuated rearwardly there will be a relatively collapsing movement between bows 13 and 14, causing joint 19 to collapse through action of links 16.

When the top is completely lowered, parts thereof take the position as shown in Fig. 2.

As is well known, up-to-date automobiles are equipped with electric starters which take the form of an electric motor, the motor receiving current from a suitable battery, which battery is replenished by the motor being driven as a generator by the automobile gasolene engine, after the latter has been started by the motor.

In one application of my invention, I take advantage of the equipment of the modern automobiles which have electric motors for starting the gasolene engine of the automobile. In this way the cost of equipping an automobile with my means for automatically raising and lowering tops is reduced to a minimum. Of course, I do not limit the invention to the use of an electric motor for the purpose mentioned, for other suitable motors also may be used.

Reference again being had to the drawings, it will be seen that the automobile is provided with any suitable gasolene or power engine 30 having secured to one end of its crank shaft a gear wheel 31 which meshes with a gear wheel 32 mounted loosely upon one end of a shaft 33. Secured to this shaft is a motor 34, in this particular case an electric motor, for starting the power engine 30 of the automobile. Motion may be transmitted from the motor 34 to engine 30 for starting purposes, and from the engine 30 to drive the motor 34 as a generator, through the medium of a separable connection or clutch, one member 35 of which is formed integrally with the gear 32 and the other member 36 of which is slidably mounted upon and rotatable with the shaft 33. The movable clutch member 36 is controlled and actuated by a suitable lever 37 pivoted at 38 and having a forked portion 39 engaging a groove 40 in the movable clutch member 36. This control lever 37 not only controls the connection between the motor 34 and engine 30, but also the supply of current to the electric motor from any suitable source, such for example, as a storage battery 41. The control lever 37 has a projection of insulating material 42 which causes the movable member 43 of a switch 44 to pass into engagement with the stationary switch member 45 for completing an electric circuit from battery 41 through wires 46 and 47, switch members 43 and 45, motor 34 and back to the battery 41. The closing of the switch causes current to pass from the battery 41 through the motor 34 for actuating the latter. So by depressing the lever 37, the switch 44, is closed, first, to cause the actuation of the motor 34, and then the movable clutch member 36 passes into engagement with clutch member 35 for transmitting motion from the motor 34 through gear wheels 32 and 31 for starting the power engine 30 of the vehicle. Of course, it is well understood that after the engine 30 is started, the clutch still being in, the engine 30 will drive the motor 34 as a generator for pumping current back into the battery 41 where it is stored for later use. When the control lever 37 is released, it is moved back to its normal position by any suitable spring 48 causing clutch member 36 to pass out of engagement with clutch member 35, and switch members 43 and 45 to separate, the former being drawn away from the latter by a suitable spring 49 secured to projection 42.

This motor 34 also I use for another purpose; namely, for actuating or raising and lowering the top or weather-protective part 12 of the vehicle. Motion may be transmitted from the motor 34 to the top in many ways. In this particular instance motion is transmitted from the motor 34 through shaft 33, suitable clutch and reversing mechanism to be described later, shaft 50 having a gear 51, meshing with a gear 52 mounted on a cross shaft 53 having secured thereto on opposite ends thereof gear members 54 and 55, each of which meshes with similar suitably supported members 56, which in turn mesh with geared segments 57 mounted upon the lower ends of the pivotally mounted main bow member 13 of the top. A clutch member 58 is slidably mounted upon and rotatable with the shaft 50. For raising the top, the clutch member should be passed into engagement with a coöperating clutch member 59 formed integrally with a gear 60 keyed to shaft 33. For lowering the top, the clutch member 58 should be passed into engagement with a clutch member 61 formed integrally with a loose gear rotatable on shaft 50, a reverse motion being given to shaft 50 for lowering the top 12 through gears 63, 64, and 65, the first meshing with gear 60 and being mounted on a shaft 66 with the second, and the third gear 65 meshes with gears 64 and 62.

The clutch member 58 is actuated and controlled by a suitable hand lever 67, which like control lever 37 is located in a convenient place for the operator. The connection between the control lever 67 and movable clutch member 58 includes a link 68 connected to said lever 67 and to one arm of a bell-crank 69, the other arm being connected to another link 70 connected to an arm 71 on a shaft 110, to which is connected another arm 111, the latter of which is connected to a link 72 having a laterally projecting portion 73 extending through and pivotally connected to a clutch shifting arm 74, pivotally mounted at 75 and having a forked portion 76 which is received in an annular groove 77 of clutch member 58. Therefore, by means of this connection, when the control lever 67 is pushed forward, movable clutch member 58 is thrown into engagement with clutch member 59, thereby making a direct connection between shafts 33 and 50 for raising the top 12. At the same time, by pushing the lever 67 forward an electric circuit is completed for causing the motor to raise the top through this connection. This electric circuit is completed by the insulated movable contact 80 at one end of lever 67 moving into engagement with contact segment 81, whereupon current flows from battery 41 through wires 46 and 82, movable contact 80, segment 81, wire 83, adjustable resistance 84, wire 85, motor 34 and back to the battery 41, thereby causing the motor to rotate for completely raising the top.

After the top is completely raised, it is well to prevent further raising movement being transmitted to the top. This is done by causing the clutch member 58 to automatically pass out of engagement with cooperating clutch 59 at the proper time. The mechanism for accomplishing this result includes an arm 86 secured to a shaft 87 and lying in the path of movement of a projection 88 on side of gear 54, which projection, as the top is being raised moves downward, ultimately passing into engagement with arm 86 causing it to rock shaft 87 clockwise, as viewed in Fig. 1, thereby moving forward an arm 89, mounted on said shaft 87, which causes a link 90 secured to said arm 89 to move forward also. It will be noted that the forward end of link 90 has an elongated eye portion 91 in which the projecting portion 73 of link 72 may move. As shown in Figs. 1 and 3 of the drawings, the top has been completely raised, the projection 88 having rotated arm 86, shaft 87, arm 89, and pushed forward link 90 and projection 73, which at this time engages the rear of eye portion 91, to actuate clutch shifting arm 74 to move clutch member 58 from clutch member 59 thereby preventing further raising movement being transmitted from the motor 34 to the top 12. In this way no damage will be done to the top in raising it.

After the top is raised and the clutch automatically thrown out, the hand control lever will be moved back automatically into its middle, neutral or normal position, in which position the current supply to the motor is broken.

To lower the top, the hand control lever is pushed rearwardly causing the contact 80 to engage contact segment 92 thus completing the motor and battery circuit to cause the motor to be rotated. At the same time the clutch shifting arm will be moved through its connections with lever 67 to cause clutch member 58 to engage clutch member 61, whereupon motion will be transmitted from motor 34 through shaft 33, gears 60, 63, 64, 65 and 62, clutch members 61 and 58, shaft 50, gears 51 and 52, shaft 53, gears 54 and 55 meshing respectively with gears 56, which in turn mesh with toothed segments 57 at the ends of main bow 13 to completely lower the top. At the proper time during the top lowering movement another projection 93 on the side of gear 54 passes into engagement with and moves arm 86 upwardly, arm 89 and link 90 backwardly to throw clutch member 58 out of engagement with clutch member 61, it being understood that projection 73 at this time being in the front end of eye portion 91. In this way the clutch is thrown out automatically to prevent further lowering movement being transmitted from the motor 34 to the top 12 after the top is completely lowered. After the top is lowered the control lever will be automatically moved to neutral position for breaking the current circuit between the battery 41 and motor 34.

It will be noted that an adjustable resistance 84 is placed in the supply circuit between the battery and motor when the top is being actuated. The function of this adjustable resistance is to control the amount of current supplied from the battery to the motor to control the speed of the motor. It is desirable that the motor rotate slowly when it is being used to actuate the top to prevent any undue severe strains being thrust upon the parts. Slow rotation of the motor would be a direct coöperation between the action of the motor and the automatic means for throwing out the clutch at the proper times when the top is being raised and lowered.

This automatic means for throwing out the clutch at the proper times when the top is being raised and lowered, renders the mechanism fool proof and insures no damage being done to the top in its movements.

To further protect the top I have provided a safety interlock between engine control lever 37 and top control lever 67. A detail view of the two control levers and the safety interlock therebetween is shown in Fig. 4. For the sake of clearness it is not shown in the other figures of the drawings. This safety interlock includes a link 95, one end of which is pivotally connected to engine control lever 37 at the point 96, the other end thereof being pivotally connected to one arm 97 of a bell crank, the other arm of said bell crank having a slot 98 for the reception of a laterally extending projection 99 of a rod 100. This rod has a head 101 which is adapted to be received in a slotted portion 102 of a sector plate 103 on the top control lever 67. As shown in Fig. 4, the head 101 of rod 100 is out of the slot 102 so that either lever 67 or 37 may be operated. The head 101 of rod 100 may be moved into the slot 102 of sector plate 103 by the actuation of lever 37 in its movement to start the engine 30 by means of the motor in the manner fully described. But it will be noted that top control lever 67 cannot be moved when the head 101 is in slot 102. By means of this arrangement the top 12 cannot be connected to power shaft 33 when the motor 34 and engine 30 are connected to each other. On the other hand, when the head 101 is withdrawn from slot 102, the top control lever 67 may be moved either way for the desired purposes. But when lever 67 is moved in either direction from its normal neutral position, the curved top of the head 101 engages the curved lower edge 104 of the sector plate 103, thereby locking the engine control lever 37 against a movement to connect the motor 34 and engine 30. The engine control lever 37 being thus locked, the top may be actuated safely without fear of damaging same. This safety interlock adds to the fool proof feature of the arrangement.

It is evident that various modifications of the arrangement here shown may be made and it is my intention to cover all such modifications which do not depart from the spirit and scope of my invention as set forth in the following claims.

What I claim as new is:—

1. In a vehicle, the combination of a top adapted to be actuated, a motor therefor, a connection between said top and motor, means for controlling said motor and said connection, and other means for controlling said connection under certain conditions.

2. In combination, a vehicle body, a top mounted thereon and movable to and from an operative position, an engine for propelling the vehicle, and power means for actuating said engine and for moving said top.

3. In a vehicle, the combination of a top adapted to be actuated, a power engine, a starter for said engine, and for actuating said top, means for controlling the starting of said power engine by said starter, means for controlling the actuation of said top by said starter, and an interlock between said two controlling means.

4. In combination, a vehicle body, a top mounted thereon and movable to and from an operative position, an engine for propelling the vehicle, power means for actuating said engine and for moving said top, and means for controlling the transmission of power from said power means to said engine and top.

5. In a vehicle, the combination of a top adapted to be actuated, a power engine, means for starting said engine and actuating said top, and interconnected control means for the engine and top.

6. In a vehicle, the combination of a top adapted to be actuated, a power engine, means for starting said engine and actuating said top, and means to prevent one of these operations while the other is being done.

7. In a vehicle, the combination of a top adapted to be actuated, a power engine, a motor for starting said engine and actuating said top, and means to prevent motion being transmitted to said top when motion is being transmitted between said engine and motor.

8. In a vehicle, the combination of a top adapted to be actuated, a power engine, means for actuating said engine and top, a connection between said means and said top, a connection between said means and said engine, and control means for said connections whereby when one of said connections is effective the other is ineffective.

9. In a vehicle, the combination of a top adapted to be actuated, a power engine, means for actuating said engine and top, a connection between said means and said top, a connection between said means and said engine, a control member for each of said connections, and means whereby only one of said control members can be operated at a time.

10. In a vehicle, the combination of a vehicle body, a top mounted on said body and adapted to be actuated, a power engine for propelling the vehicle, and a single power mechanism for actuating said engine and said top.

11. In a vehicle, the combination of a top adapted to be actuated, a power engine for propelling the vehicle, and means located between said top and said power engine for actuating the top and power engine.

12. In a vehicle, the combination of a top adapted to be raised, a power engine for propelling the vehicle, means for starting said engine and also for raising said top, a connection between said means and top, a connection between said means and engine, and control means for said connections.

CHAS. L. BYRON.